United States Patent
Kang et al.

(10) Patent No.: US 11,249,756 B2
(45) Date of Patent: Feb. 15, 2022

(54) NATURAL LANGUAGE PROCESSING METHOD AND APPARATUS

(71) Applicant: Samsung Electronics Co., Ltd., Suwon-si (KR)

(72) Inventors: Tae Gyoon Kang, Seoul (KR); Min-Joong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/812,600

(22) Filed: Mar. 9, 2020

(65) Prior Publication Data
US 2021/0109752 A1  Apr. 15, 2021

(30) Foreign Application Priority Data
Oct. 14, 2019  (KR) .................. 10-2019-0127148

(51) Int. Cl.
*G06F 7/02* (2006.01)
*G06F 9/30* (2018.01)
*G06F 40/42* (2020.01)
*G06N 3/08* (2006.01)
*G06F 17/16* (2006.01)

(52) U.S. Cl.
CPC .......... *G06F 9/30036* (2013.01); *G06F 17/16* (2013.01); *G06F 40/42* (2020.01); *G06N 3/08* (2013.01)

(58) Field of Classification Search
CPC ...... G06F 9/30036; G06F 40/42; G06F 17/16; G06N 3/08
See application file for complete search history.

(56) References Cited

U.S. PATENT DOCUMENTS

| | | | |
|---|---|---|---|
| 9,420,559 B2 | 8/2016 | Bai et al. | |
| 10,049,106 B2 | 8/2018 | Goyal et al. | |
| 10,599,645 B2* | 3/2020 | Lefebure | ............... G06F 40/211 |
| 2014/0075566 A1* | 3/2014 | Farkash | ................... G06F 21/60 726/26 |
| 2017/0127016 A1 | 5/2017 | Yu et al. | |
| 2018/0129931 A1 | 5/2018 | Bradbury et al. | |
| 2018/0341860 A1 | 11/2018 | Shazeer et al. | |
| 2019/0130249 A1 | 5/2019 | Bradbury et al. | |
| 2019/0130273 A1 | 5/2019 | Keskar et al. | |

FOREIGN PATENT DOCUMENTS

| | | | |
|---|---|---|---|
| JP | 6351689 B2 | 7/2018 | |
| KR | 10-2018-0138321 A | 12/2018 | |
| WO | WO 2019/084551 A1 | 5/2019 | |

* cited by examiner

*Primary Examiner* — Cheng Yuan Tseng
(74) *Attorney, Agent, or Firm* — NSIP Law

(57) ABSTRACT

A processor implemented natural language processing method and apparatus are provided. The natural language processing method includes converting a natural language phrase into a token vector, calculating a repetition count of the token vector, and generating an input vector by encoding the token vector based on the calculated repetition count and a position of the token vector.

25 Claims, 6 Drawing Sheets

NATURAL LANGUAGE PROCESSING METHOD AND APPARATUS

CROSS-REFERENCE TO RELATED APPLICATIONS

This application claims the benefit under 35 USC § 119(a) of Korean Patent Application No. 10-2019-0127148 filed on Oct. 14, 2019 in the Korean Intellectual Property Office, the entire disclosure of which is incorporated herein by reference for all purposes.

BACKGROUND

1. Field

The following description relates to a natural language processing method and apparatus.

2. Description of Related Art

In natural language processing that implements an existing neural network, a problem that occurs when the order of tokens is not identified may be corrected with positional encoding.

Positional encoding employs a scheme of expressing an absolute order of each token in a sequence using a trigonometric function or using a separately defined weight matrix.

Existing embedding schemes are principally determined based on absolute or relative positions of tokens in the entire sequence, irrespective of the content of input tokens, but do not consider outputs that are changed based on the previous history.

Existing positional encoding does not consider the history of tokens and thus, may be vulnerable to the repetition in units of letters, words, and phrases. Thus, if an attention fails to consider the existing output history in an actual model inference, the same output sequence may be repeated a number of times.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a processor implemented natural language processing method includes converting a natural language phrase into a token vector, calculating a repetition count of the token vector; and generating an input vector by encoding the token vector based on the calculated repetition count and a position of the token vector.

The calculating of the repetition count may include calculating a local repetition count of the token vector in a word; and calculating a global repetition count of the token vector in a sentence.

The generating of the input vector may include generating an encoding vector based on the repetition count and the position of the token vector; and generating the input vector by encoding the token vector based on the generated encoding vector.

The generating of the encoding vector may include calculating a function value corresponding to the position of the token vector; and generating the encoding vector by adding the function value to the repetition count.

The calculating of the function value may include calculating a sinusoidal function value corresponding to the position of the token vector.

The generating of the input vector may include generating the input vector by performing an element-wise summation with respect to the encoding vector and the token vector.

The generating of the encoding vector may include generating the encoding vector by extracting a learnable vector from a learnable matrix based on the repetition count.

The generating of the input vector may include generating the input vector by concatenating the token vector and the encoding vector.

The generating of the input vector may include replacing the token vector with a repetition count vector generated based on the calculated repetition count, in response to the token vector being a repeated token vector; and generating the input vector based on the token vector replaced with the repetition count vector and the position of the token vector.

The generating of the input vector may further include calculating a function value corresponding to the position of the token vector; and generating the input vector by adding the calculated function value to the token vector replaced with the repetition count vector.

The method may further include outputting the natural language in a text form by inputting the input vector into a neural network.

The method may further include training a neural network based on the input vector.

In a general aspect, a natural language processing apparatus includes a processor configured to convert a natural language phrase into a token vector; calculate a repetition count of the token vector; and generate an input vector by encoding the token vector based on the calculated repetition count and a position of the token vector.

The processor may be further configured to calculate a local repetition count of the token vector in a word, and calculate a global repetition count of the token vector in a sentence.

The processor may be further configured to generate an encoding vector based on the repetition count and the position of the token vector, and generate the input vector by encoding the token vector based on the encoding vector.

The processor may be further configured to calculate a function value corresponding to the position of the token vector, and generate the encoding vector by adding the function value to the repetition count.

The processor may be further configured to calculate a sinusoidal function value corresponding to the position of the token vector.

The processor may be further configured to generate the input vector by performing an element-wise summation with respect to the encoding vector and the token vector.

The processor may be further configured to generate the encoding vector by extracting a learnable vector from a learnable matrix based on the repetition count.

The processor may be further configured to generate the input vector by concatenating the token vector and the encoding vector.

The processor may be further configured to replace the token vector with a repetition count vector generated based on the repetition count, in response to the token vector being a repeated token vector; and generate the input vector based on the token vector replaced with the repetition count vector and the position of the token vector.

The processor may be further configured to calculate a function value corresponding to the position of the token vector, and generate the input vector by adding the calculated function value to the token vector replaced with the repetition count vector.

The processor may be further configured to output the natural language in a text form by inputting the input vector into a neural network.

The processor may be further configured to train a neural network based on the input vector.

In a general aspect, a method includes receiving a natural language input; converting the natural language input into token vectors; generating a token vector sequence including the token vectors; calculating at least one of a local repetition count of the token vectors and a global repetition count of the token vectors; generating an input vector by encoding the token based on the calculated local repetition count or the calculated global repetition count; and outputting the received natural language in a text form by inputting the generated input vector into a neural network.

The local repletion count may be a repetition count of the token vectors in a single word, and the global repetition count may be a repetition count of the token vectors in a single sentence.

The method may further include generating the input vector based on a position of the token vectors.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Figure 1:
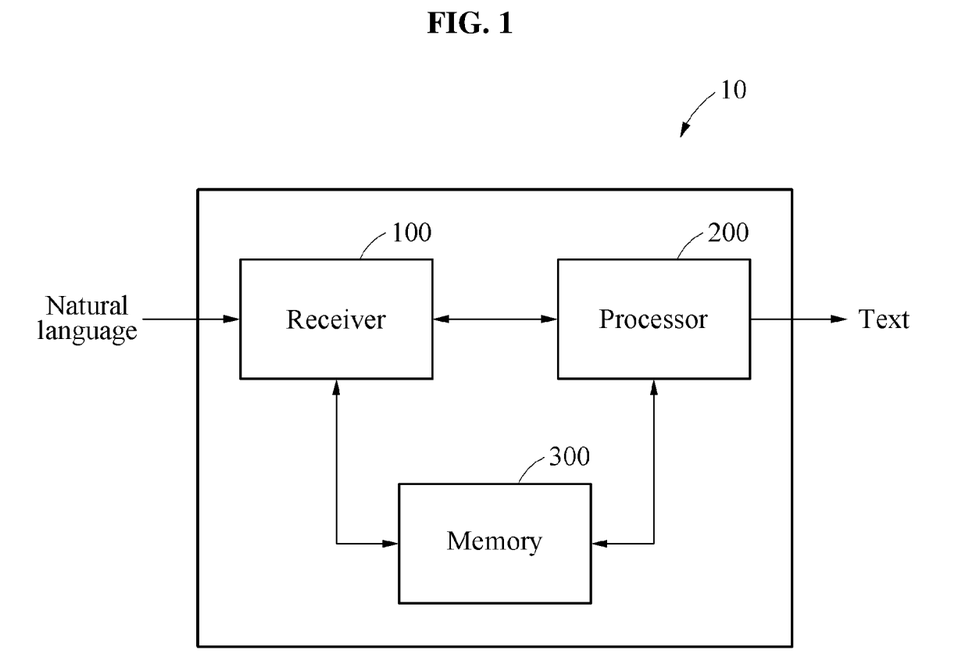
FIG. 1 illustrates an example of a natural language processing apparatus, in accordance with one or more embodiments.

FIG. 1 illustrates an example of a natural language processing apparatus.

Referring to FIG. 1, a natural language processing apparatus 10 processes a natural language. The natural language includes human languages. A human language is a means, such as via speech sounds or letters, used to express or deliver human thoughts or feelings, or a social custom system of the speech sounds or letters.

The natural language processing apparatus 10 may be, as non-limiting examples, a personal computer (PC), a server, a mobile device, and the like, and may further correspond to, or be an apparatus provided in, autonomous vehicles, robotics, smartphones, tablet devices, augmented reality (AR) devices, Internet of Things (IoT) devices, and similar devices, which perform voice recognition, speech recognition, and image recognition by implementing a neural network, but the present disclosure is not limited thereto, and may correspond to various other types of devices.

The natural language processing apparatus 10 outputs text by processing the natural language. For example, the natural language processing apparatus 10 recognizes the natural language including speech sounds, or translates the natural language including speech sounds and/or text. The text may include letters or a set of letters. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The translation of the natural language may include a transformation from the syntactic structures of a natural language into effective algebraic forms for further exact processing.

The natural language processing apparatus 10 performs speech recognition. For example, the natural language processing apparatus 10 recognizes a speech of a human and outputs the recognized speech in text form.

Before a neural network computation starts in earnest, the natural language processing apparatus 10 calculates a repetition count of the same token vector and reflects the calculated repetition count in encoding, in an operation of positional encoding of the token vector.

The "token" may refer to the words or text or the basic units in natural language phrases. The "token" may be a string of characters between spaces or punctuation marks within a natural language phrase. As an example, a "token" may be a natural language word that is included in a natural language phrase. Each token may be mapped to a token vector in a multidimensional space. Token vectors may encode semantic features of the corresponding token. The distance between pairs of tokens (or words) in the multidimensional space may be indicative of semantic similarities between the pairs of tokens.

In an example, the natural language processing apparatus 10 determines the number of times the current input token vector has appeared repeatedly previous to an attention block.

For this, the natural language processing apparatus 10 adds new encoding, in which sinusoidal positional encoding is applied to word embedding of the token vector, or adds and expresses a new token vector expressing a repetition with a previous token vector to a dictionary based on a predetermined standard with respect to the input token vector.

The natural language processing apparatus 10 includes a receiver 100, a processor 200, and a memory 300.

The memory 300 is hardware for storing various pieces of neural network data processed by the processor 200, and may store various applications to be driven by the processor 200. The memory 300 may include at least one of volatile memory or nonvolatile memory. The nonvolatile memory may include read only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), ferroelectric RAM (FRAM), and the like. The volatile memory may include dynamic RAM (DRAM), static RAM (SRAM), synchronous DRAM (SDRAM), phase-change RAM (PRAM), magnetic RAM (MRAM), resistive RAM (RRAM), ferroelectric RAM (FeRAM), and the like. Furthermore, the memory 300 may include at least one of hard disk drives (HDDs), solid state drive (SSDs), compact flash (CF) cards, secure digital (SD) cards, micro secure digital (Micro-SD) cards, mini secure digital (Mini-SD) cards, extreme digital (xD) cards, or Memory Sticks.

Referring to FIG. 1, the receiver 100 receives a natural language input or a corpus including the natural language.

The receiver 100 receives the natural language provided in the form of speech sounds or letters. For example, the receiver 100 includes a microphone, as a non-limiting example. The receiver 100 outputs the received natural language to the processor 200.

The processor 200 processes data stored in the memory 300. The processor 200 executes computer-readable instructions stored in the memory 300 and instructions triggered by the processor 200. In an example, the natural language processing apparatus 10 may further store instructions, e.g., in memory 300, which when executed by the processor 200 configure the processor 200 to implement one or more or any combination of operations herein. The processor 200 and the memory 300 may be respectively representative of one or more processors 200 and one or more memories 300.

The "processor 200" is a data processing device implemented by hardware including a circuit having a physical structure to perform and control desired operations of the natural language processing apparatus 10. For example, the desired operations include instructions or codes included in a program.

For example, the hardware-implemented data processing device includes a microprocessor, a central processing unit (CPU), a processor core, a multi-core processor, a multiprocessor, an application-specific integrated circuit (ASIC), a graphics processing unit (GPU), an application processor (AP), a neural processing unit (NPU), and a field-programmable gate array (FPGA).

The processor 200 processes the natural language using a neural network, and trains the neural network. The processor 200 outputs text by processing the natural language. The neural network may be configured to perform, as non-limiting examples, object classification, object recognition, voice recognition, speech recognition, and image recognition by mutually mapping input data and output data in a nonlinear relationship based on deep learning. Such learning is indicative of processor implemented machine learning schemes for solving issues, such as issues related to automated image or speech recognition from a data set, as non-limiting examples.

The processor 200 converts the natural language into token vectors, and generates a token sequence including the token vectors by converting the natural language.

The token vectors are vectors generated by tokenizing the corpus including the natural language. The corpus is a set of language samples extracted for a predetermined purpose.

The processor 200 tokenizes the corpus based on a predetermined standard, and tokenizes the corpus based on a set of letters having meanings. For example, the processor 200 tokenizes the corpus based on phonemes, syllables, or words.

The token vectors are tokens generated by the processor 200 through tokenization and expressed in the form of vectors. The processor 200 outputs text by receiving and processing a token sequence including one or more token vectors.

The processor 200 calculates a repetition count of a token vector. The processor 200 calculates the repetition count of the token vector in an entirety or a portion of the token sequence. For example, the processor 200 calculates the repetition count of the token vector in a single word, or calculates the repetition count of the token vector in a single sentence.

The processor 200 calculates the repetition count in a local boundary obtained using linguistic knowledge or a sliding window. The calculated repetition count is used as an index for processing a repeated token.

Specifically, the processor 200 calculates a local repetition count and a global repetition count of the token vector. The local repetition count is the repetition count of the token vector in a single word, and the global repetition count is the repetition count of the token vector in a single sentence.

The local repetition count and the global repetition count are calculated in a shorter or longer token sequence, based on the examples. For example, the local repetition count and the global repetition count are calculated in a unit of a sentence, a paragraph, or the entire text.

In an example, the processor 200 calculates the local repetition count in a word of the token vector, and calculates the global repetition count in a sentence of the token vector.

The processor 200 generates an input vector by encoding the token vector based on the repetition count of the token vector and a position of the token vector. The position of the token vector is a positional order of the token vector in the token sequence. For example, when a token sequence including 10 token vectors is sequentially input, positions of the token vectors indicate an order the token vectors are input.

The processor 200 generates an encoding vector based on the calculated repetition count of the token vector and the position of the token vector. The processor 200 generates an encoding vector using a sinusoidal function and/or a learnable matrix.

Encoding corresponds to performing encoding of the token vector by performing a predetermined vector operation on the token vector. The encoding vector is a predetermined vector generated by the processor 200 for the encoding operation with the token vector. In an example, the dimension of the encoding vector is the same as the dimension of the token vector.

The processor 200 calculates a function value corresponding to the position of the token vector. Specifically, the processor 200 calculates a sinusoidal function value corresponding to the position of the token vector, and generates the encoding vector by adding the function value to the calculated repetition count.

The processor 200 generates the encoding vector by extracting a learnable vector from a learnable matrix based on the repetition count.

The processor 200 determines a max repetition count and generates the encoding vector based on the max repetition count and the learnable matrix.

The processor 200 generates the learnable matrix, and generates the encoding vector by extracting a vector of a row or a column corresponding to the repetition count from the learnable matrix.

The processor 200 generates a learnable matrix with a row size corresponding to the max repetition count and a column size corresponding to the dimension of the token vector.

The processor 200 generates the encoding vector by extracting a vector from the determined learnable matrix using the repetition count as an index.

For example, if the max repetition count is "3" and the dimension of a token vector to be encoded is "5", the processor 200 generates a learnable matrix as shown below.

[1, 2, 3, 4, 5

6, 7, 8, 9, 10

11, 12, 13, 14, 15]

If the repetition count is "i", the processor 200 extracts a vector of an i-th row. For example, if the repetition count is "2", the processor 200 extracts [6, 7, 8, 9, 10] and uses the extracted vectors as encoding vectors. If the repetition count is "3", the processor 200 extracts [11, 12, 13, 14, 15] and uses the extracted vectors as encoding vectors. The processor 200 generates a learnable matrix having a predetermined value as an initial value. The processor 200 trains the learnable matrix in advance. The processor 200 trains the learnable matrix in the same manner for a neural network, using a gradient generated from an output.

In another example, the processor 200 generates a sinusoidal matrix using a sinusoidal function. The processor 200 generates the sinusoidal matrix including a row of vectors with the size the same as the dimension of the token vector using a value of the sinusoidal function.

The processor 200 generates the encoding vector by extracting a sinusoidal vector from the sinusoidal matrix based on the repetition count.

The processor 200 generates the input vector in various manners, and generates the input vector by encoding the token vector based on the calculated repetition count.

The input vector is a vector to be input into the neural network. The processor 200 outputs text by inputting the generated input vector into the neural network. Further, the processor 200 trains the neural network using the generated input vector.

In an example, the processor 200 generates the input vector by encoding the token vector based on the generated encoding vector. The processor 200 generates the input vector by performing an element-wise summation with respect to the encoding vector and the token vector.

The processor 200 generates the input vector by concatenating the token vector and the encoding vector.

For example, if token vectors are [10, 20, 30, 40, 50] and encoding vectors are [6, 7, 8, 9, 10], the processor 200 generates input vectors using an element-wise summation and/or a vector concatenation.

If the element-wise summation is used, the processor 200 generates input vectors [16, 27, 38, 49, 60] by performing an element-wise summation with respect to the token vectors and the encoding vectors.

If the vector concatenation is used, the processor 200 generates input vectors [10, 20, 30, 40, 50, 6, 7, 8, 9, 10] by concatenating the token vectors and the encoding vectors.

An example in which the processor 200 generates the input vector based on the encoding vector will be described in detail with reference to FIG. 4.

In another example, the processor 200 generates the input vector by replacing the token vector based on the repetition count. If the token vector is a repeated token vector, the processor 200 replaces the token vector with a repetition count vector generated based on the repetition count.

The repetition count vector is a vector having, as a component, a repetition count of the same token. The processor 200 generates the input vector based on the token vector replaced with the repetition count vector and the position of the token vector.

The processor 200 calculates the function value corresponding to the position of the token vector, and generates the input vector by adding the calculated function value to the token vector replaced with the repetition count vector.

The processor 200 generates the input vector in various manners by combining a plurality of encoding vector generating methods and a plurality of input vector generating methods.

An example in which the processor 200 generates the input vector using the repetition count vector will be described in detail with reference to FIG. 5.

The processor 200 outputs the natural language in text by inputting the generated input vector into the neural network. Further, the processor 200 trains the neural network using the input vector.

The memory 300 stores instructions (or a program) executable by the processor 200. For example, the instructions include instructions for performing the operation of the processor 200 and/or an operation of each component of the processor 200.

The memory 300 may be implemented as a volatile memory device or a non-volatile memory device.

The volatile memory device may be implemented as a dynamic random access memory (DRAM), a static random access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque-MRAM (STT-MRAM), a conductive bridging RAM (CBRAM), a ferroelectric RAM (FeRAM), a phase change RAM (PRAM), a resistive RAM (RRAM), a nanotube RRAM, a polymer RAM (PoRAM)), a nano floating gate memory (NFGM), a holographic memory, a molecular electronic memory device, or an insulator resistance change memory.

Figure 2:
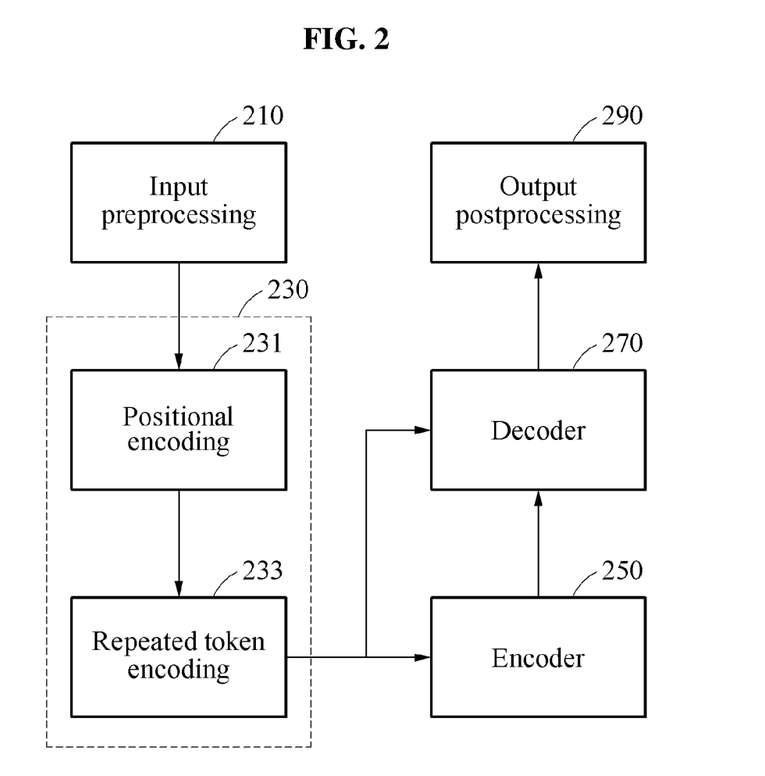
FIG. 2 illustrates an example of the processing of a natural language by a natural language processing apparatus, in accordance with one or more embodiments.
Figure 3:
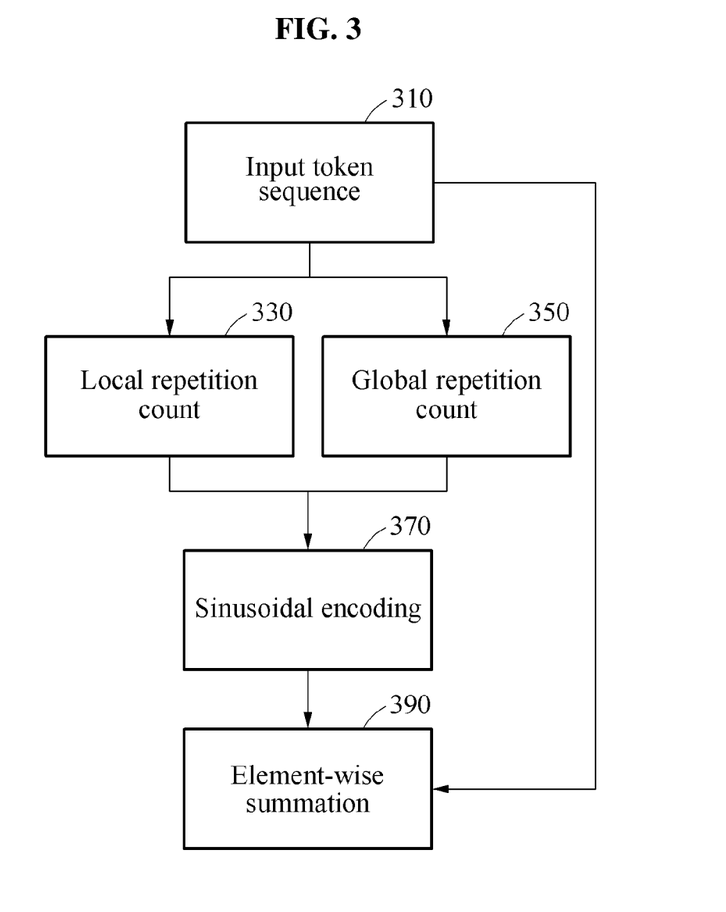
FIG. 3 illustrates an example of encoding performed by a natural language processing apparatus, in accordance with one or more embodiments.

FIG. 2 illustrates an example of processing a natural language by the natural language processing apparatus of FIG. 1, and FIG. 3 illustrates an example of encoding performed by the natural language processing apparatus of FIG. 1.

Referring to FIG. 2, in operation 210, the processor 200 performs input preprocessing by receiving a natural language input. In the preprocessing operation, the processor 200 converts a text input into a token ID sequence. The processor 200 retrieves a vector mapped to each token from an embedding matrix and provides the vector to an input terminal of a neural network.

For example, if a token ID is "12", the processor 200 retrieves a twelfth column of the embedding matrix and provides the twelfth column to the input terminal of the neural network.

The processor 200 sets each letter as a single token, or sets each word as a single token, to convert the text into token IDs. The processor 200 generates a token dictionary of subword units based on a criterion such as a frequency, and converts the input text based on the generated dictionary.

For example, the processor 200 generates the token dictionary using a scheme such as byte pair encoding, word-piece, or sentencepiece.

The processor 200 converts the natural language into a token vector. In operation 230, the processor 200 encodes the token vector. The processor 200 encodes the token vector based on a position of the token vector.

Encoding may include positional encoding 231 and repeated token encoding 233. Hereinafter, repeated token encoding will be used in the same sense as repeated token embedding.

The example of FIG. 2 illustrates operations including local or global repeated token encoding together with positional encoding. In the example of FIG. 2, an input is a token vector having gone through word embedding, and positional encoding and repeated token encoding may7 be used to generate an encoding vector corresponding to a position of each token vector in a sentence, the token vector generated using a sinusoidal function.

Positional encoding 231 refers to a series of operations of reflecting position information in the token vector corresponding to each word to indicate position information of a token, for example, a word, in the token sequence converted from the input natural language.

Positional encoding 231 includes an operation of reflecting position information of the token vector using the sinusoidal function. That is, positional encoding 231 includes sinusoidal encoding. For example, the processor 200 performs positional encoding 231 using a sine function and a cosine function.

The processor 200 extracts a function value corresponding to an index of the dimension in the vector and the position of the token vector for positional encoding 231.

For example, the processor 200 performs positional encoding using Equations 1 and 2.

$$PE_{(pos,2i)} = \sin(pos/10000^{2i/d_{model}}) \quad \text{Equation 1:}$$

$$PE_{(pos,2i+1)} = \cos(pos/10000^{2i/d_{model}}) \quad \text{Equation 2:}$$

In Equations 1 and 2, "pos" denotes the position of the token vector, and "i" denotes the index of the dimension in the token vector. "$D_{model}$" denotes the dimension of an output of the neural network used by the natural language processing apparatus 10 or the dimension of the token vector.

Repeated token encoding 233 refers to an encoding operation for reflecting a history of the token vector by reflecting a repetition count of the token vector in the token vector.

The example of FIG. 3 illustrates a process of generating an input vector through encoding. As shown in the example of FIG. 3, the order of sinusoidal encoding and repeated token encoding may be changed. That is, repeated token encoding may be performed first and then, positional encoding may be performed.

The processor 200 performs repeated token encoding by calculating a local repetition count and a global repetition count of the token vector. The local repetition count refers to a repetition count in a relatively narrow range, when compared to the global repetition count.

For example, the local repetition count is a repetition count of the same token in a single word, and the global repetition count is a repetition count of the same token in a single sentence.

In another example, the processor 200 calculates, as the local repetition count, a repetition count of a token vector which is the same as a current token vector by analyzing token vectors of up to a predetermined point in time in the past based on a word piece sequence with a predetermined length, a plurality of words, or a single word.

That is, the local repetition count and the global repetition count may be replaced with repetition counts in a narrower or wider range, as necessary.

Referring to FIG. 2, the processor 200 inputs the encoded token vector into an encoder 250 or a decoder 270. A single encoder 250 or a plurality of encoders 250 may be provided, and similarly, a single decoder 270 or a plurality of decoders 270 may be provided. The encoder 250 and the decoder 270 may each include a plurality of sublayers.

The encoder 250 performs attention and outputs text by processing the encoded token vector through a neural network. For example, the encoder 250 generates a context vector by compressing information of the input token vector and outputs the generated context vector to the decoder 270.

The neural network implemented by the encoder 250 may include, as non-limiting examples, a feedforward neural network, a self-attention network, a fully connected network, a deep convolutional network and/or a recurrent neural network (RNN), or may include different or overlapping neural network portions respectively with such full, convolutional, or recurrent connections. The RNN includes long short-term memory (LSTM) models.

The decoder 270 includes a plurality of sublayers configured to perform attention with respect to the output of the encoder 250. The decoder 270 performs attention and processes the output of the encoder 250 or the encoded token vector through a neural network. The neural network implemented by the decoder 270 includes, as non-limiting examples, a feedforward neural network and/or an RNN.

The encoder 250 and the decoder 270 may implement a neural network other than the RNN and the feedforward neural network, as necessary. Further, the processor 200 may implement only the decoder 270, without implementing the encoder 250, based on the examples.

In operation 290, the processor 200 post-processes the output of the decoder 270. The processor 200 performs postprocessing in a reverse order of preprocessing. The processor 200 restores the token ID sequence into text. The processor 200 restores a sentence by connecting strings matching the token dictionary described above.

The example of FIG. 3 illustrates the order of encoding performed by the processor 200. In operation 310, the processor 200 receives a token sequence. In operation 330, the processor 200 calculates a local repetition count. In operation 350, the processor 200 calculates a global repetition count.

The calculating of the local repetition count and the calculating of the global repetition count are the same as the description provided above.

The processor 200 performs encoding based on the position of the token vector. The processor 200 performs positional encoding. For example, the processor 200 performs sinusoidal encoding 370. Sinusoidal encoding 370 is the same as that described above.

The processor 200 performs repeated token encoding 233 based on the local repetition count and the global repetition count. The processor 200 generates an encoding vector through an element-wise summation 390 of the local repetition count and the global repetition count and a result of sinusoidal encoding 370.

The processor 200 encodes the token vector using the encoding vector. For example, the processor 200 generates an input vector by encoding the token vector through an element-wise summation of the encoding vector and the token vector.

The processor 200 transmits, to the encoder 250 and/or the decoder 270, information of a repeated prior token by encoding the token vector using the encoding vector.

Figure 4:
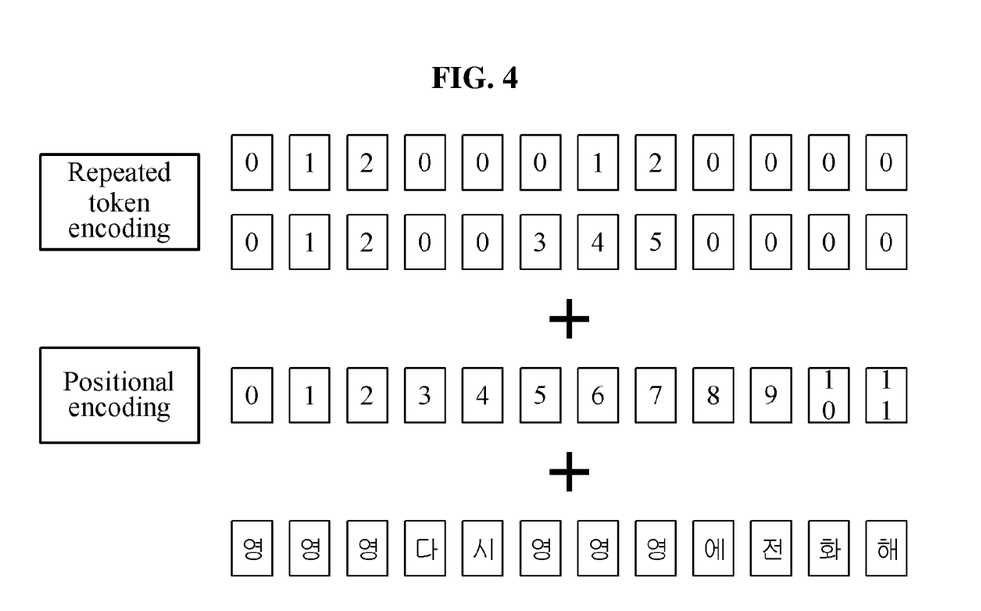
FIG. 4 illustrates an example of encoding performed by a natural language processing apparatus, in accordance with one or more embodiments.

FIG. 4 illustrates an example of encoding performed by the natural language processing apparatus of FIG. 1.

Referring to FIG. 4, the processor 200 receives an input natural language "영영영 다시 영영영에 전화해 [Call zero zero zero dash zero zero zero]". The processor 200 converts the input natural language into a token sequence including token vectors.

In the example of FIG. 4, a token vector corresponds to a single syllable. The processor 200 calculates a repetition count from the input natural language. The processor 200 calculates a local repetition count and a global repetition count.

The processor 200 generates vectors corresponding to the calculated local repetition count and the calculated global repetition count. In the example of FIG. 4, a repetition count is indicated using a single number, which, however, may be in the form of a vector. For example, the vectors corresponding to the local repetition count and the global repetition count may have same dimension with the token vector.

In this example, the local repetition count is a repetition count of the same token vector in a single sentence. The processor 200 calculates that the second "영 [zero]" and the third "영 [zero]" are repeated in "영영영 [zero zero zero]" classified as a single word. Similarly, the processor 200 calculates the local repetition count identically with respect to "영영영 [zero zero zero]" which are input in a sixth to eight sequence.

The global repetition count is a repetition count of the same token vector in a single sentence. The processor 200 calculates a repetition count of a token vector corresponding to "영 [zero]" in "영영영 다시 영영영에 전화해 [Call zero zero zero dash zero zero zero]".

In the example of FIG. 4, "영 [zero]" is repeated five times, except for its first input. The processor 200 generates vectors corresponding to the global repetition count.

The processor 200 performs positional encoding based on positions of the token vectors. Positional encoding is the same method as described above. In the example of FIG. 4, positional encoding is indicated as 0, 1, 2, . . . , 11. However, the processor 200 generates vectors corresponding to 0, 1, 2, . . . , 11 which are positions of token vectors in reality.

The processor 200 generates encoding vectors through an element-wise summation of the vectors generated using repeated token encoding and the vector generated using positional encoding. The processor 200 performs encoding the token vectors through an element-wise summation of the token vectors and the encoding vectors.

Figure 5:
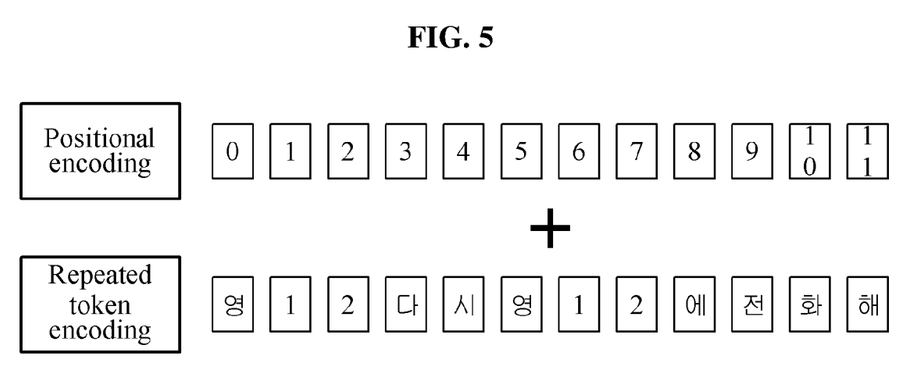
FIG. 5 illustrates an example of encoding performed by a natural language processing apparatus, in accordance with one or more embodiments.

FIG. 5 illustrates an example of encoding performed by the natural language processing apparatus of FIG. 1.

Referring to FIG. 5, the processor 200 performs repeated token encoding by replacing a token vector based on a repetition count of the token vector, without separately generating a repeated token vector.

The processor 200 replaces a repeated token vector with a repetition count vector. For example, if a natural language "영영영 다시 영영영에 전화해 [Call zero zero zero dash zero zero zero]" is input, the processor 200 replaces the repeated "영 [zero]" with the repetition count vector.

In this example, the processor 200 generates the repetition count vector based on a repetition count in a single word. In the example of FIG. 5, the processor 200 replaces "영 [zero]" which is input second and "영 [zero]" which is input third, with a repetition count vector corresponding to "1" and a repetition count vector corresponding to "2", respectively. As described above with reference to FIG. 4, "1" and "2" indicated in FIG. 5 are in the form of vectors during operation.

Similarly, the processor 200 replaces "영 [zero]" which is input seventh and "영 [zero]" which is input eighth, with the repetition count vector corresponding to "1" and the repetition count vector corresponding to "2", respectively.

The processor 200 encodes token vectors through an element-wise summation of the token vectors replaced with the repetition count vectors by performing repeated token encoding and vectors generated as a result of positional encoding.

By performing encoding by replacing the token vectors with the repetition count vectors, a neural network easily learns that a currently input token vector is a repeated token of a previously input token vector.

Figure 6:
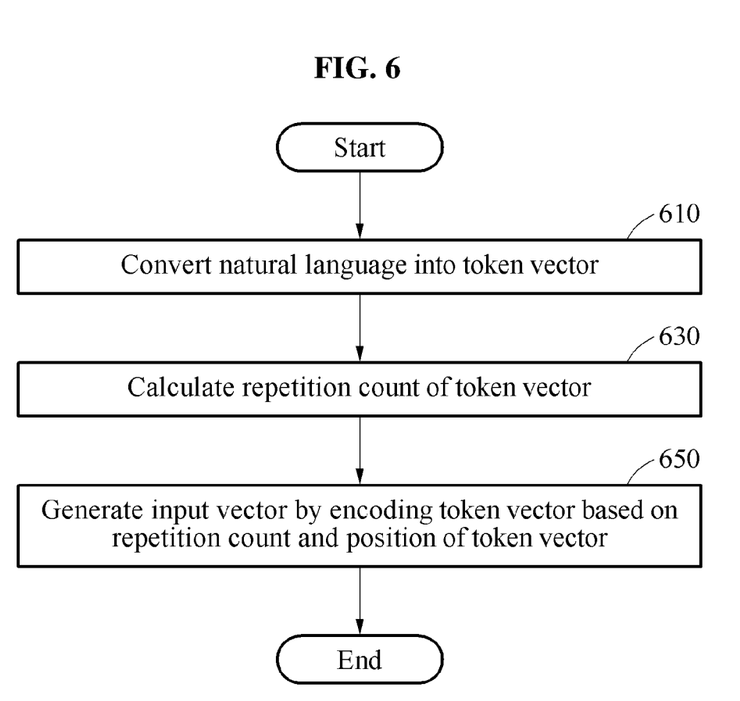
FIG. 6 illustrates an example of operations of a natural language processing apparatus, in accordance with one or more embodiments.

FIG. 6 illustrates an example of operations of the natural language processing apparatus of FIG. 1, in accordance with one or more embodiments. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer that perform the specified functions, or combinations of special purpose hardware and computer instructions. In addition to the description of FIG. 6 below, the descriptions of FIGS. 1-5 are also applicable to FIG. 6, and are incorporated herein by reference. Thus, the above description may not be repeated here.

Referring to FIG. 6, in operation 610, the processor 200 converts a natural language into a token vector.

In operation 630, the processor 200 calculates a repetition count of the token vector. The processor 200 calculates a local repetition count of the token vector in a word. The processor 200 calculates a global repetition count of the token vector in a sentence.

In operation 650, the processor 200 generates an input vector by encoding the token vector based on the repetition count and a position of the token vector.

The processor 200 generates an encoding vector based on the repetition count and the position of the token vector, and calculates a function value corresponding to the position of the token vector.

Specifically, the processor 200 calculates a sinusoidal function value corresponding to the position of the token vector, and generates the encoding vector by adding the calculated function value to the calculated repetition count.

The processor 200 generates the input vector by encoding the token vector based on the encoding vector. Specifically, the processor 200 generates the input vector by performing an element-wise summation with respect to the encoding vector and the token vector.

The processor 200 replaces the token vector with a repetition count vector generated based on the repetition count, in response to the token vector being a repeated token vector. The processor 200 generates the input vector based on the token vector replaced with the repetition count vector and the position of the token vector.

The processor 200 calculates the function value corresponding to the position of the token vector, and generates the input vector by adding the function value to the token vector replaced with the repetition count vector.

The processor 200 outputs the natural language in text by inputting the input vector into a neural network. Further, the processor 200 trains the neural network using the input vector.

The natural language processing apparatus 10, receiver 100, processor 200, memory 300, encoder 250, decoder, 270 and other apparatuses that perform the operations described in this application are implemented as and by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented natural language processing method, comprising:
   generating, by one or more processors, a token sequence including plural token vectors by converting a speech of a natural language phrase into the plural token vectors;
   determining, by the one or more processors, a repetition count of a token vector, of the plural token vectors, in the token sequence;
   encoding, by the one or more processors, the token vector based on the calculated repetition count and a position of the token vector to generate an input vector; and
   recognizing, by the one or more processors, the speech of the natural language phrase, using a result of the generating the input vector,
   wherein the generating of the input vector comprises:
   replacing the token vector with a repetition count vector generated based on the calculated repetition count, in response to the token vector being a repeated token vector; and
   generating the input vector based on the token vector replaced with the repetition count vector and the position of the token vector.

2. The method of claim 1, wherein the calculating of the repetition count comprises:
   calculating a local repetition count of the token vector in a word; and
   calculating a global repetition count of the token vector in a sentence.

3. The method of claim 1, wherein the generating of the input vector comprises:
   generating an encoding vector based on the repetition count and the position of the token vector; and
   generating the input vector by encoding the token vector based on the generated encoding vector.

4. The method of claim 3, wherein the generating of the encoding vector comprises:
   calculating a function value corresponding to the position of the token vector; and
   generating the encoding vector by adding the function value to the repetition count.

5. The method of claim 4, wherein the calculating of the function value comprises calculating a sinusoidal function value corresponding to the position of the token vector.

6. The method of claim 3, wherein the generating of the input vector comprises generating the input vector by performing an element-wise summation with respect to the encoding vector and the token vector.

7. The method of claim 3, wherein the generating of the encoding vector comprises generating the encoding vector by extracting a learnable vector from a learnable matrix based on the repetition count.

8. The method of claim 3, wherein the generating of the input vector comprises generating the input vector by concatenating the token vector and the encoding vector.

9. The method of claim 1, wherein the generating of the input vector further comprises:
   calculating a function value corresponding to the position of the token vector; and
   generating the input vector by adding the calculated function value to the token vector replaced with the repetition count vector.

10. The method of claim 1, further comprising:
    outputting the recognized speech of the natural language phrase in a text form by inputting the input vector into a neural network.

11. The method of claim 1, further comprising:
    training a neural network based on the input vector.

12. A natural language processing apparatus, comprising:
a processor configured to:
   generate a token sequence including plural token vectors by converting a speech of a natural language phrase into the plural token vectors;
   determine a repetition count of a token vector, of the plural token vectors, in the token sequence;
   encode the token vector based on the calculated repetition count and a position of the token vector to generate an input vector; and
   recognize the speech of the natural language phrase, using a result of the generating the input vector,
   wherein, for the generating of the input vector, the processor is configured to:
   replace the token vector with a repetition count vector generated based on the calculated repetition count, in response to the token vector being a repeated token vector; and
   generate the input vector based on the token vector replaced with the repetition count vector and the position of the token vector.

13. The apparatus of claim 12, wherein the processor is further configured to:
   calculate a local repetition count of the token vector in a word, and
   calculate a global repetition count of the token vector in a sentence.

14. The apparatus of claim 12, wherein the processor is further configured to;
   generate an encoding vector based on the repetition count and the position of the token vector, and
   generate the input vector by encoding the token vector based on the encoding vector.

15. The apparatus of claim 14, wherein the processor is further configured to:
   calculate a function value corresponding to the position of the token vector, and
   generate the encoding vector by adding the function value to the repetition count.

16. The apparatus of claim 15, wherein the processor is further configured to:
   calculate a sinusoidal function value corresponding to the position of the token vector.

17. The apparatus of claim 14, wherein the processor is further configured to:
   generate the input vector by performing an element-wise summation with respect to the encoding vector and the token vector.

18. The apparatus of claim 14, wherein the processor is further configured to:
   generate the encoding vector by extracting a learnable vector from a learnable matrix based on the repetition count.

19. The apparatus of claim 14, wherein the processor is further configured to:
   generate the input vector by concatenating the token vector and the encoding vector.

20. The apparatus of claim 12, wherein the processor is further configured to:
   calculate a function value corresponding to the position of the token vector, and
   generate the input vector by adding the calculated function value to the token vector replaced with the repetition count vector.

21. The apparatus of claim 12, wherein the processor is further configured to:
   output the recognized speech of the natural language phrase in a text form by inputting the input vector into a neural network.

22. The apparatus of claim 12, wherein the processor is further configured to train a neural network based on the input vector.

23. A processor-implemented method comprising:
   receiving, by one or more processors, a speech of a natural language input;
   converting, by the one or more processors, the speech of the natural language input into token vectors;
   generating, by the one or more processors, a token vector sequence including the token vectors;
   calculating, by the one or more processors, at least one of a local repetition count of the token vectors and a global repetition count of the token vectors;
   generating, by the one or more processors, an input vector by encoding the token vectors based on the calculated local repetition count or the calculated global repetition count; and
   recognizing, by the one or more processors, the speech of the received natural language input by inputting the generated input vector into a neural network,
   wherein the generating of the input vector comprises:
   replacing the token vector with a repetition count vector generated based on the calculated repetition count, in response to the token vector being a repeated token vector; and
   generating the input vector based on the token vector replaced with the repetition count vector and the position of the token vector.

24. The method of claim 23, wherein the local repletion count is a repetition count of the token vectors in a single word, and the global repetition count is a repetition count of the token vectors in a single sentence.

25. The method of claim 24, further comprising generating the input vector based on a position of the token vectors.

* * * * *